United States Patent [19]

Isozaki

[11] Patent Number: 5,586,020

[45] Date of Patent: Dec. 17, 1996

[54] PROGRAM TRANSFORMATION PROCESSING SYSTEM AND METHOD

[75] Inventor: Hiroko Isozaki, Tokyo, Japan

[73] Assignee: NEC Corporation, Tokyo, Japan

[21] Appl. No.: 392,483

[22] Filed: Feb. 23, 1995

[30] Foreign Application Priority Data

Feb. 23, 1994 [JP] Japan .................................. 6-024589

[51] Int. Cl.⁶ .................................................. G05B 19/42
[52] U.S. Cl. .......................................... 395/707; 395/709
[58] Field of Search ................................. 364/191, 192, 364/148, 300; 395/700, 200, 800, 375

[56] References Cited

U.S. PATENT DOCUMENTS

| | | | |
|---|---|---|---|
| 4,773,007 | 9/1988 | Kanada et al. | 364/300 |
| 4,841,570 | 6/1989 | Cooper | 380/30 |
| 5,315,710 | 5/1994 | Kishimoto et al. | 395/700 |
| 5,434,972 | 7/1995 | Hamlin | 395/200 |
| 5,485,619 | 1/1996 | Lai et al. | 395/700 |

FOREIGN PATENT DOCUMENTS

| | | |
|---|---|---|
| 64-3737 | 1/1989 | Japan . |
| 64-31232 | 2/1989 | Japan . |

OTHER PUBLICATIONS

Aho et al., *Compilers: Principles, Techniques, and Tools*, Addison–Wesley Publishing Co., pp. 627–631 and 633–634.

*Primary Examiner*—Paul P. Gordon
*Assistant Examiner*—Ramesh Patel
*Attorney, Agent, or Firm*—Foley & Lardner

[57] ABSTRACT

A program transformation processing system comprises a syntax analyzing part receiving a source program for analyzing the syntax of the received source program and generating intermediate codes in a predetermined format, and an optimization processing part receiving the intermediate codes to perform a predetermined optimization processing for generating an object code having as small program size as possible and as short execution time as possible. The optimization processing part includes a candidate intermediate code selection part for selecting from the intermediate codes an optimization candidate intermediate code which meets with a predetermined selection condition and which has possibility of one being to be optimized, an optimized pattern extracting part for performing a searching using the candidate intermediate code as a starting point, to extract an optimized pattern which is a pattern of the intermediate codes to be optimized, and an optimized intermediate code outputting part for outputting an optimized intermediate code corresponding to the optimized pattern.

4 Claims, 11 Drawing Sheets

```
i = 0 ;
if (a+b > c) {
        i = 2 ;
}
else if (d < a+b) {
        i = 3 ;
}
.
.
```

```
; line 4 :    i= 0 ;
    subw    ax,ax
    movw    !__i,ax movw    ax,!__b
    movw    bc,!__a
    addw    bc,ax          ~51
; line 5 :    if(a+b>c) {
    movw    ax,!__c
    cmpw    bc,ax
    ble     $L0003
; line 6 :    i= 2 ;
    movw    ax,#02H;2
    movw    !__i,ax
    br      $L0004
L0003 :
; line 7 :    }
; line 8 :    else if(d<a+b ) {
    movw    ax,!__d
    cmpw    ax,bc
    bge     $L0005
; line 9 :    i= 3 ;
    movw    ax,#03H;3
    movw    !__i,ax
L0005 :
L0006 :
L0004 :
```
TOTAL 50 BYTES

FIGURE 8B

```
; line 4 :    i= 0 ;
    subw    ax,ax
    movw    !__i,ax
; line 5 :    if(a+b>c) {
    movw    ax,!__b
    movw    bc,!__a
    addw    bc,ax          ~61
    movw    ax,!__c
    cmpw    bc,ax
    ble     $L0003
; line 6 :    i= 2 ;
    movw    ax,#02H;2
    movw    !__i,ax
    br      $L0004
L0003 :
; line 7 :    }
; line 8 :    else if(d<a+b ) {
    movw    ax,!__b
    movw    bc,!__a
    addw    bc,ax          ~62
    movw    ax,!__d
    cmpw    ax,bc
    bge     $L0005
; line 9 :    i= 3 ;
    movw    ax,#03H;3
    movw    !__i,ax
L0005 :
L0006 :
L0004 :
```
TOTAL 60 BYTES

```
        movw    ax,!__b
        movw    bc,!__a
        cmpw    bc,ax          ⎱ 71
        be      $L0001
        bl      $L0002
        PROCESSING A
        br      $L0003
L0002 :
        PROCESSING B
        br      $L0003
L0001 :
        PROCESSING C
L0003 :
```

---

TOTAL 18 BYTES
(EXCLUDING PROCESSINGS A, B AND C)

1

PROGRAM TRANSFORMATION PROCESSING SYSTEM AND METHOD

BACKGROUND OF THE INVENTION

1. Field of the Invention

The present invention relates to a program transformation processing system and a program transformation processing method, and more specifically to a program transformation processing system and a program transformation processing method, for optimizing a language processing program such as a compiler.

2. Description of Related Art

A compiler is a language processing program for translating a source program written in a high level language into a machine language program which can be executed by a computer, namely, an object module (called "object" hereinafter). In general, a software processed by this kind of language processing program is required to be executed at a high processing speed. In order to realize a high speed execution, it is a necessary condition that the size of the object (which is the result of the language processing) is small and the execution speed of the object is high. To meet with these requirements, the language processing program has adopted various optimizing methods, for example, to delete or modify redundant operations on the object, and to replace an operation needing a relatively long execution time, with another kind of program requiring only a short execution time.

In particular, in connection with the extent to be optimized, the optimization is divided into a local optimization and a global optimization. In the local optimization, there is processed a program extent (the extend of a basic block) in which expressions and assignment statements are continuously executed with their order being not changed, without branching from the mid way of the program to an external and without branching from an external to the mid way of the program. On the other hand, in the global optimization, there is processed an extent exceeding the basic block, such as a syntax elements in which a branch occurs at a plurality of positions, for example, a compound statement, a for statement (repeating statement), a procedure, and a function. Since the global optimization is required to analyze and convert the program over a wide extent, the compiling time corresponding becomes long, but more sophisticated optimization can be realized. Therefore, the global optimization has a great advantage.

Figure 1:
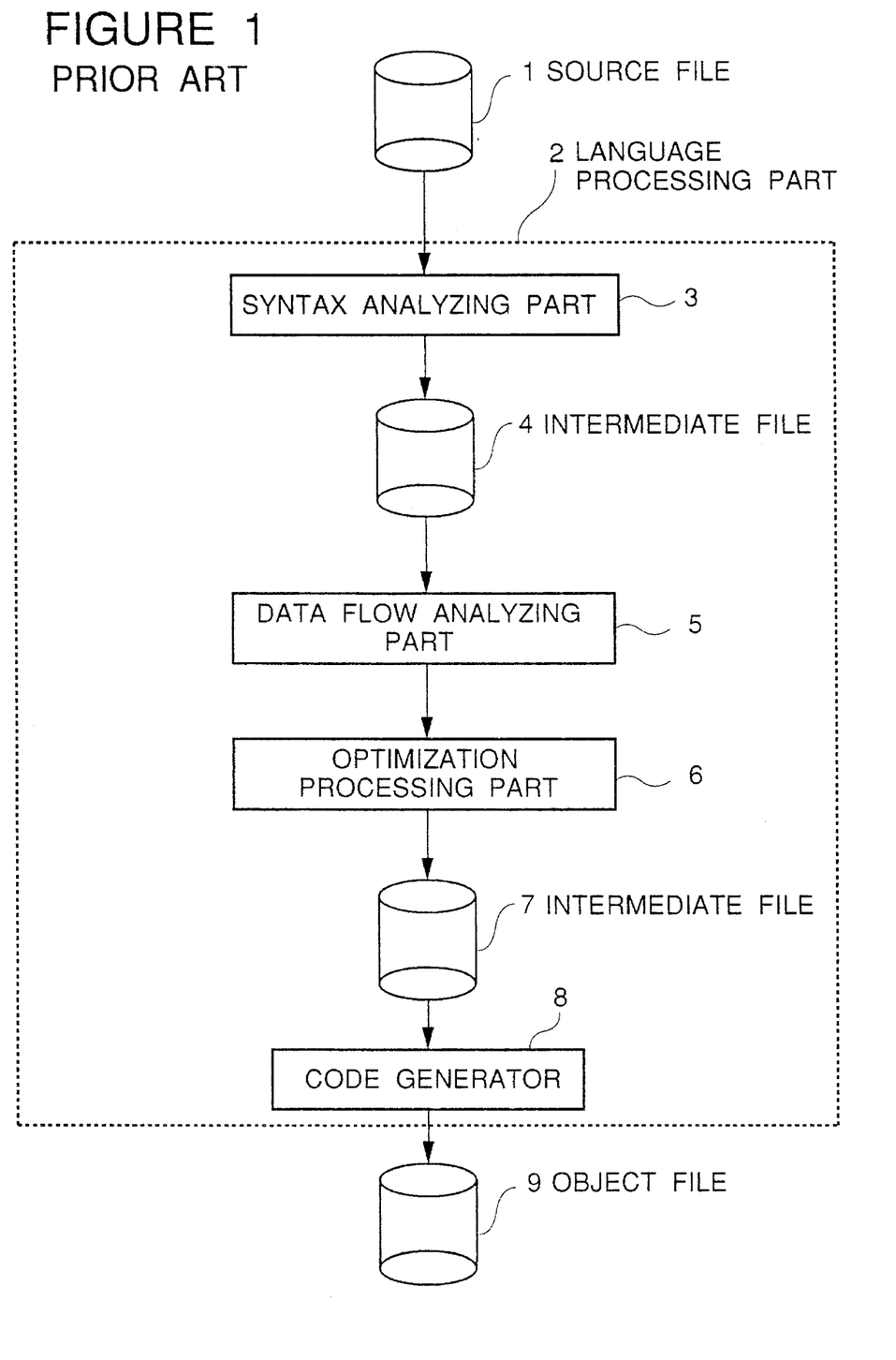
FIG. 1 is a block diagram illustrating a first conventional program transformation processing system configured to perform the global optimization.

Referring to FIG. 1, there is shown a block diagram illustrating a conventional program transformation processing system configured to perform the global optimization. This conventional program transformation processing system includes a source file 1 for storing a source program, a language processing part 2 receiving the source program for executing the optimizing processing on the received source program so as to generate an object code, and an object file 9 receiving and storing the generated object code.

The language processing part 2 includes a syntax analysis part 3 receiving the source program for analyzing the syntax so as to generate intermediate codes corresponding to the source program, an intermediate file 4 receiving and storing the generated intermediate codes, a data-flow analyzing part 5 receiving the intermediate codes for executing a data-flow analysis, an optimization processing part 6 for performing the optimization processing on the basis of the result of the data-flow analysis, another intermediate file 7 for storing intermediate data which is the result of the optimization

2 processing, and a code generator 8 receiving the intermediate data for generating object codes.

Next, the conventional program transformation processing method will be described with reference to FIG. 1. First, the syntax analysis part 3 receives the source program from the source file 1, and analyzes the content of the received source program and generates the intermediate codes by transforming the source program into a form which can be language-processed. The intermediate codes are stored in the intermediate file 4. Then, the data-flow analyzing part 5 receives the intermediate codes from the intermediate file 4, and executes the data-flow analysis which will be explained later. Thereafter, on the basis of the result of the data-flow analysis, the optimization processing part 6 performs various optimization processing, for example, common subexpression elimination, and register allocation. The intermediate data, which is the result of the optimization processing, is stored in the intermediate file 7. The code generator 8 receives the intermediate data from the intermediate file 7 and generates the object codes, which are stored in the object file 9.

Now, global data-flow analysis and optimization manner will be explained with reference to a conventional first program transformation method for performing a common subexpression elimination, described in A. V. AHO et al "Compilers: Principles, Techniques, and Tools", Addison-Welsley Publication Company, pages 627–631 and 633–634.

If two expressions, generally, two subexpressions, are equivalent to each other, it is possible to complete evaluation with one time evaluation processing. If a given subexpression is firstly evaluated, the result of the evaluation is stored as a temporary variable, and thereafter, the variable is substituted for the common subexpressions. This is called a "common subexpression elimination".

In the global data-flow analysis, the intermediate codes are read out from the intermediate file, are divided into basic blocks which is a unit, all statements included in which are continuously executed. Then, information concerning a flow of control for the processing execution is added to a set of basic blocks thus prepared, so that a flow graph is generated. The flow graph expresses a flow of processings in the form of a graph having a direction, in which each node is constituted of one string of statements or intermediate language sequentially executed, and a edge is formed by a flow of controls coupling between nodes.

Figure 2:
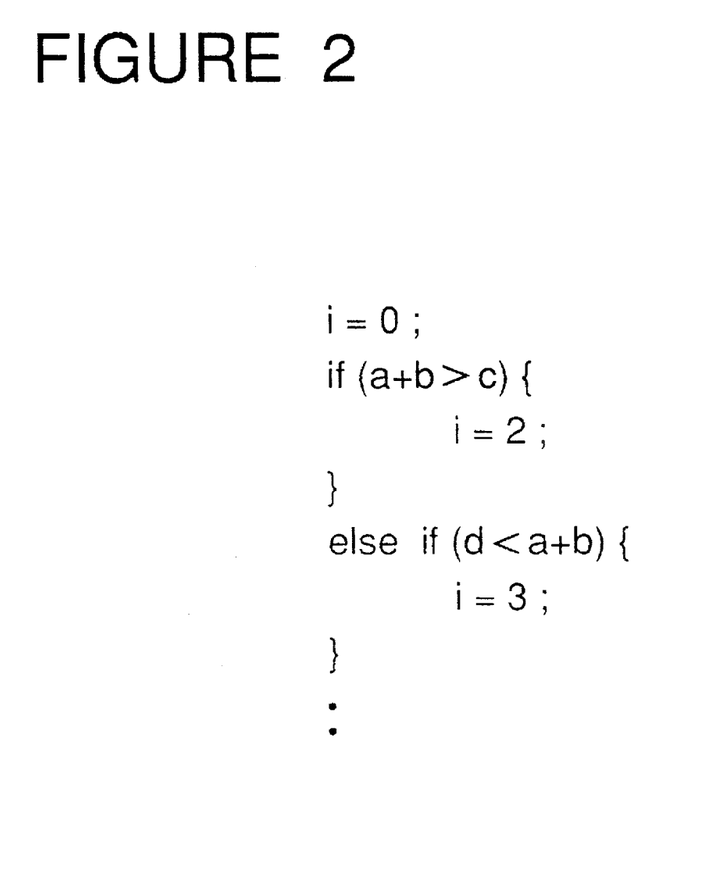
FIG. 2 illustrates one example of a source program for which the optimization processing is performed.
Figure 3A:
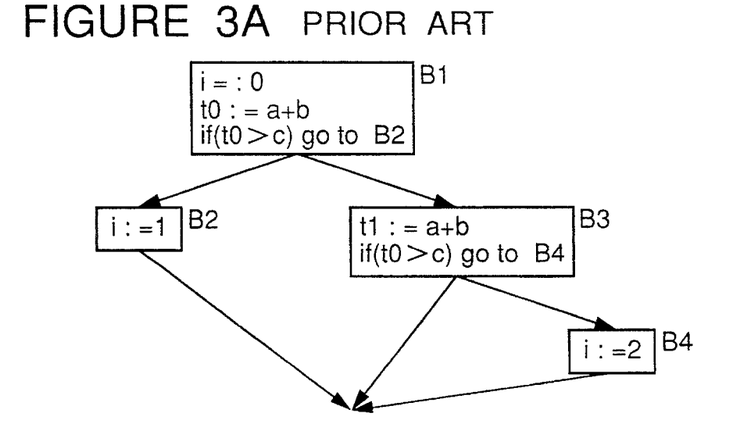
FIG. 3A illustrates a flow graph corresponding to the source program shown in FIG. 2.

FIG. 2 illustrates one example of a source program for which the optimization processing is performed. The source program shown in these figures contains a "if" statement in which an alternative selection (one out of two) is performed in accordance with a condition. Referring to FIG. 3A which illustrates a flow graph corresponding to the source program shown in FIG. 2, the source program shown in FIG. 2 is divided into four basic blocks B1, B2; B3 and B4. Here, a first block B1 is called an "initial node". As shown in FIG. 3A, each of the blocks B1 and B3 including the "if" statement is branched into two.

Figure 3B:
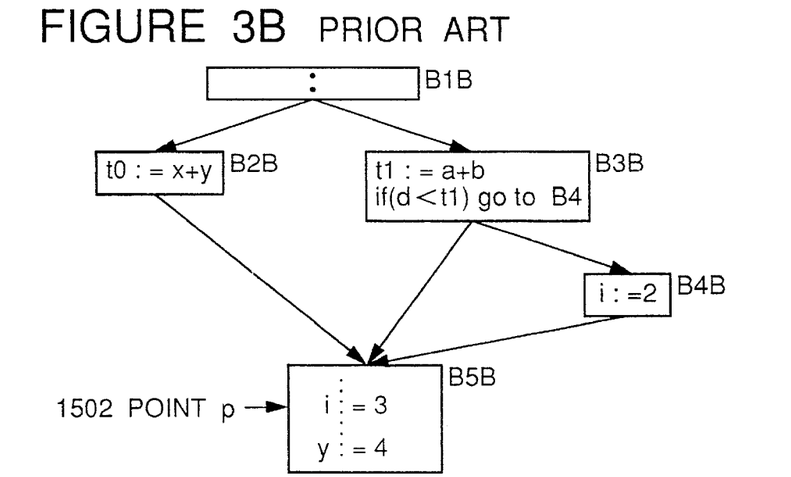
FIG. 3B is a flow graph illustrating the available expression.

Then, information for available subexpressions, which is information required to eliminate common subexpressions, is sought. In the following, the available subexpression will be called an available expression. Here, referring to FIG. 3B which is a flow graph illustrating the available expression, an expression x+y is available at a point p of an arbitrary position, if every path from the initial node block B1B to the node p (set on the block B5B in this example) evaluates the expression x+y and after the last such evaluation prior to reaching the point p, there is no subsequent assignment to x or y. In addition, it is said that if x or y is assigned in a block B i including the expression x+y and the expression x+y is not subsequently recomputed, the block Bi kills the expression x+y. The block B5B in FIG. 3B comes under this block Bi. On the contrary, it is said that, if the block Bj evaluates the expression x+y and neither x or y is not subsequently redefined, the expression x+y is generated in the block Bj. The blocks B2B and B3B come under this block Bj.

Figure 4:
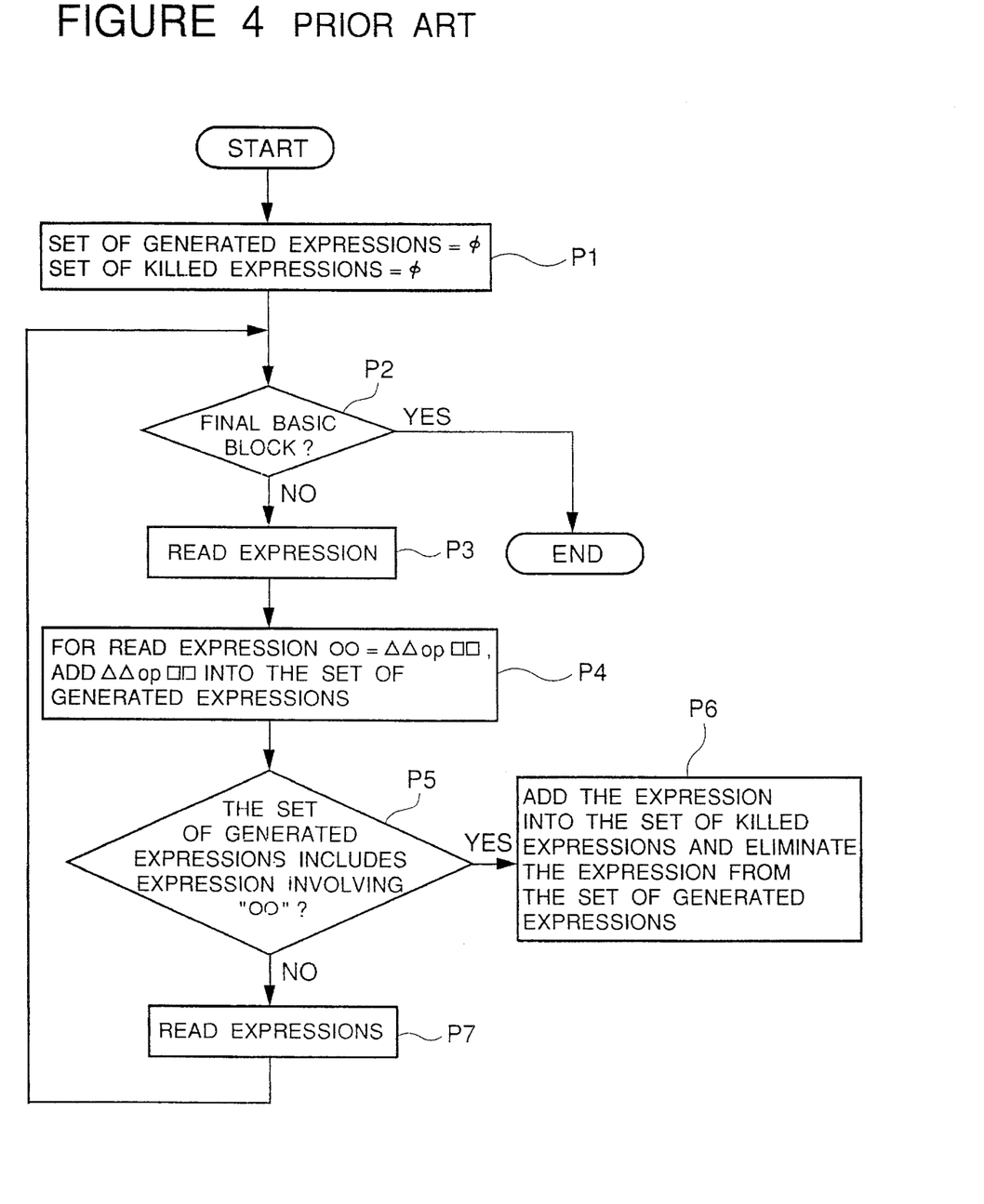
FIG. 4 is a flow chart illustrating an algorithm for obtaining the generated expression set and the killed expression set.

A first processing for seeking the information for the available expression, is to read the previously prepared flow graph, and to seek a set of subexpression generated for each basic block (called a generated expression") and a set of subexpression killed for each basic block (called a "killed expression"). Referring to FIG. 4 which is a flow chart illustrating an algorithm for obtaining the generated expression set and the killed expression set, firstly, the generated expression set and the killed expression set are respectively initialized to an empty set (Step P1). Then, whether or not a subexpression to be considered is a final basic block is examined (Step P2). If it is the final basic block, the processing is ended. If it is not the final basic block, the subexpression to be considered is read (Step P3). For this subexpression to be considered "oo=ΔΔop□□", "ΔΔop□□" is added into the generated expression set (Step P4). In addition, whether or not an expression involving "oo" is included in the generated expression set, is examined (Step P5). If it is included, the found-out expression is added into the killed expression set, and is eliminated from the generated expression set (Step P6). Thereafter, a next expression is considered (Step P7) so that the processing returns to the Step 2, again, in which the expression to be considered is a final basic block is examined. By repeating the above mentioned steps P2 to P7, the generated expression set and the killed expression set are sought, respectively.

Next, an available expression is sought. Here, it is defined that a whole set of subexpressions appearing at a right side of statements in a program is "U", a set of available expressions at the initial point in a block Bi is "in[Bi]", a set of available expressions at the final point in the block Bi is "out[Bi]", and the generated expression set and the killed expression set in the block Bi are e_gen[Bi] and e_kill[Bi], respectively. Under this definition, the following equation stands.

out[Bi]=e_gen[Bi]∪(in[Bi]−e_kill[Bi])

in[Bi]=∩out[P] for B not initial, where P is a predecessor of Bi in[B1]=ϕ where B1 is the initial block As well known to persons skilled in the art, an algorithm for solving this equation is already established. Therefore, by solving the algorithm, it is possible to obtain a set of available expressions "in[Bi]" for each block Bi.

Elimination of global common subexpressions, which is the object of the processing, is performed as follows in the optimization processing part 6 using the information of available expressions obtained as mentioned above.

If the expression y+z is available at a head of a given block, and if the given block includes a statement "s" having the content x=y+z, a processing of the following steps K1 to K4 is performed. However, it is assumed that y or z is not defined from the head of the block just before the statement "s".

In the Step K1, in order to search an evaluation portion of the expression y+z for reaching the block including the statement "s", the edge of the flow graph is scanned from the block including the statement "s" in a revered direction. However, if a block evaluating the expression y+z is found out, a block or blocks prior to the found-out block are not scanned. In the block thus detected, the last evaluation of the statement w=y+z is the evaluation portion of the expression y+z reaching the statement "s".

Next, in the step K2, a new variable "u" is generated.

Then, in the step K3, the statement w=y+z detected in the step K1 is replaced with the following statements:

u=y+z w=u

Succeedingly, in the step K4, the statement "s" is replaced with the statement x=u.

Figure 3C:
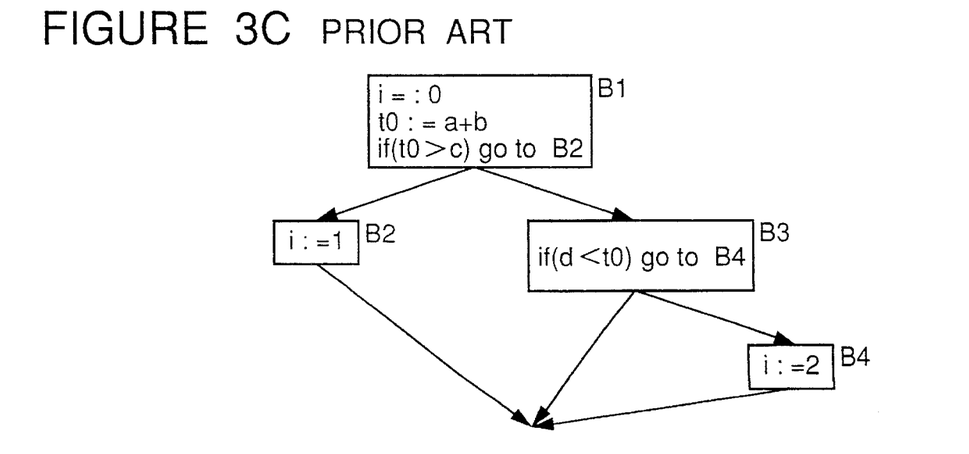
FIG. 3C illustrates the result of the global common subexpression elimination made for the flow graph shown in FIG. 3A.

In the above mentioned processing, it is possible to eliminate the common subexpression using the global data-flow analysis. FIG. 3C illustrates the result of the global common subexpression elimination made for the flow graph shown in FIG. 3A.

Here, examine the number of the processing steps for the data-flow analysis in the above mentioned first conventional program transformation processing system and method. At least two times of the whole reading of the intermediate file 4 are required, one for the block dividing, and another for the optimization after the data-flow analysis. In addition, the flow graph is prepared by searching the block flow, and the generated expression set and the killed expression set are sought for all the blocks in order to obtain the available expression. Thereafter, the common subexpression elimination is performed on the basis of the obtained available expressions. These processing needs a great number of processing steps.

In order to perform the above mentioned processings, there is required a memory region for temporarily storing not only the intermediate codes but also data which is generally of a bit vector type for the above mentioned generated expression set and killed expression set. This data of the bit vector type is such that, the number "i" is allocated to an expression to be analyzed in the flow graph, and if the number "i" belongs to the set to be obtained, the position "i" of the bit vector is expressed as "1". Accordingly, the data length of the bit vector, in one block, for example for the generated expression set is at least the bit length of the same number as the number of the generated expressions in the block concerned. For the killed expression set and the set of available expressions at each of the block entry and outlet, data of the bit vector type is formed similarly.

Even if an optimizable portion is resultantly an extremely small part of the source program, it cannot be predicted in the optimization processing part 6. Therefore, since it is necessary to perform the processing for all the blocks without exception, all data to be processed are held on the memory region. As a result, the memory region is required to have a sufficient margin for storing these data.

In order to efficiently execute the common subexpression elimination, Japanese Patent Application Laid-open Publication JP-A-64-03737 has proposed a second conventional program transformation method, which is, however, directed to a C-language compiler. In this second conventional program transformation method, address calculation and subscript expression are searched using an analysis tree, and if two common expressions giving the same operation result is found out, one of the found-out common expressions is eliminated.

However, this method is limited to only the address calculation and the subscript expression in the basic block, and no consideration is made onto the case exceeding the basic block and on other general subexpressions.

As seen from the above, the above mentioned first conventional program transformation processing system and method require a great number of processing steps for the data-flow analysis, and therefore, needs a long processing time.

In addition, a large capacity memory region is required for temporarily storing not only the intermediate codes but also various data in the course of the processing, such as the generated expression set and killed expression set corresponding to the basic block and the set of available expressions.

If the memory region does not have a sufficient margin, the optimization becomes impossible in certain cases. In this case, the size of the generated object may become large, and the processing speed may become low.

On the other hand, the above mentioned second conventional program transformation processing system and method is disadvantageous in that one to be processed is limited to the address calculation and the subscript expression, and no consideration is made onto the case exceeding the basic block and on other general subexpressions.

SUMMARY OF THE INVENTION

Accordingly, it is an object of the present invention to provide a program transformation processing system and method which has overcome the above mentioned defect of the conventional ones.

Another object of the present invention is to provide a program transformation processing system and method, which requires only a reduced memory region and which can executes its processing with a shortened processing time.

The above and other objects of the present invention are achieved in accordance with the present invention by a program transformation processing system comprising a syntax analyzing means receiving a source program for analyzing the syntax of the received source program and generating intermediate codes in a predetermined format, and an optimization processing means receiving the intermediate codes to perform a predetermined optimization processing for generating an object code having as small program size as possible and as short execution time as possible, the optimization processing means including a candidate intermediate code selection means for selecting from the intermediate codes an optimization candidate intermediate code which meets with a predetermined selection condition and which has possibility of one being to be optimized, an optimized pattern extracting means for performing a searching using the candidate intermediate code as a starting point, to extract an optimized pattern which is a pattern of the intermediate codes to be optimized, and an optimized intermediate code outputting means for outputting an an optimized intermediate code corresponding to the optimized pattern.

According to another aspect of the present invention, there is provided a program transformation processing method configured to receive a source program for analyzing the syntax of the received source program and generating intermediate codes in a syntax tree structure composed of nodes in a predetermined format, and then to receive the intermediate codes to perform a predetermined optimization processing for generating an object code having as small program size as possible and as short execution time as possible, the program transformation processing method comprising a first step of receiving the intermediate codes and performing a search by reading nodes of the syntax trees in accordance with a predetermined evaluation order, for the purpose of outputting the read nodes; a second step of selecting from the read nodes an optimization candidate intermediate node which meets with a predetermined selection condition and which has possibility of one being to be optimized; a third step of searching and detecting a directly nested node which is a node directly coupled to a predetermined constitutive word of the candidate node; a fourth step of discriminating whether or not a second conditional node equal to a first conditional node corresponding to a predetermined first conditional statement in a highest order directly nested node is included in a lower order second conditional statement when the directly nested node is detected, and of detecting the first and second, conditional nodes as a common subexpression if the above mentioned second conditional node is included in the lower order second conditional statement; and a fifth step of responding to the detection of the common subexpression to modify the syntax tree into an optimized form meeting with the optimization processing.

The above and other objects, features and advantages of the present invention will be apparent from the following description of preferred embodiments of the invention with reference to the accompanying drawings.

DESCRIPTION OF THE PREFERRED EMBODIMENTS

Figure 5:
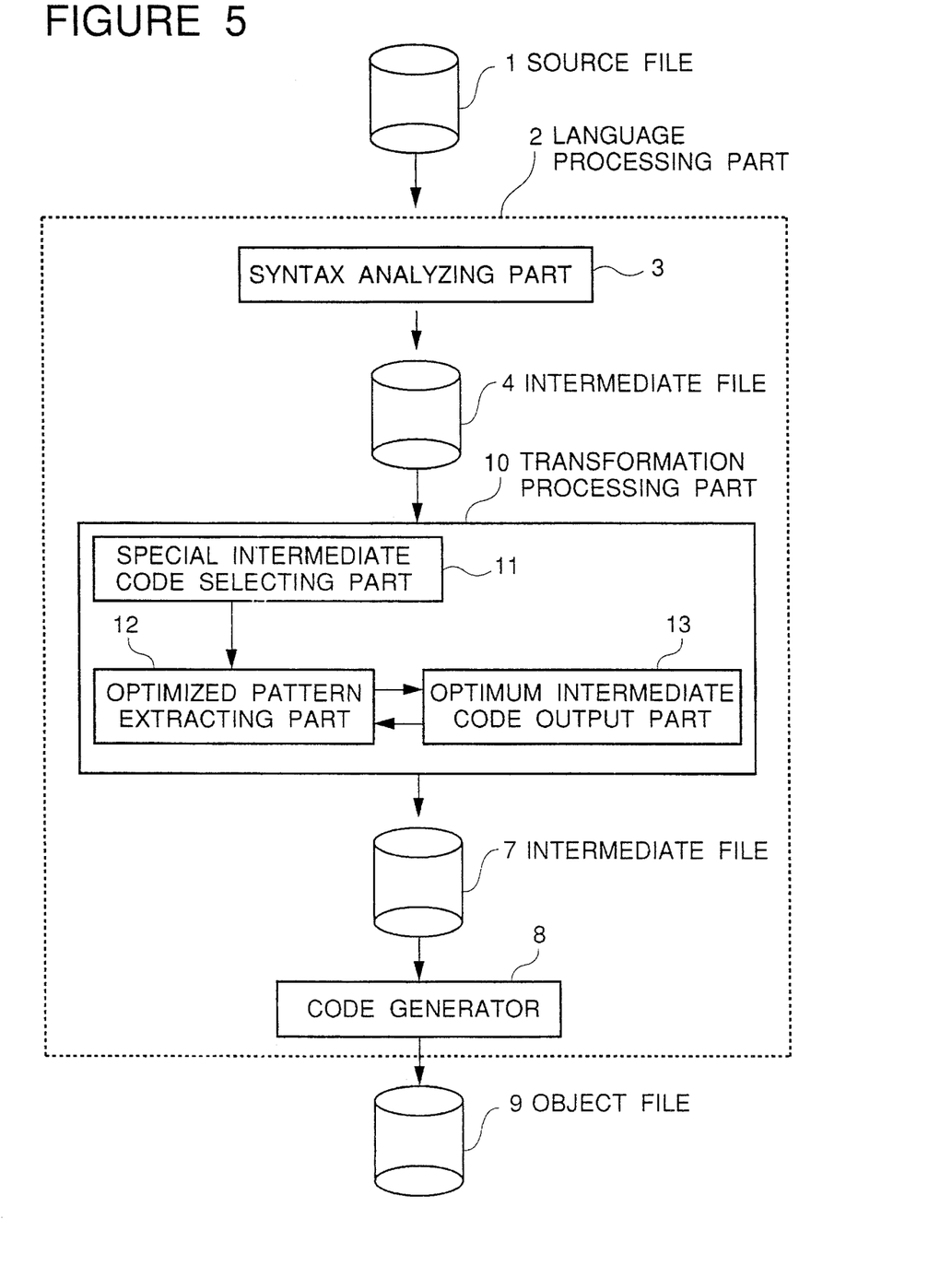
FIG. 5 is a block diagram illustrating an embodiment of the program transformation processing system in accordance with the present invention.

Referring to FIG. 5, there is shown a block diagram illustrating an embodiment of the program transformation processing system in accordance with the present invention. In FIG. 5, elements corresponding to those shown in FIG. 1 are given the same Reference Numerals, and explanation thereof will be omitted for simplification of description.

As seen from comparison between FIGS. 1 and 5, the shown embodiment of the program transformation processing system comprises, in place of the language processing part 2 shown in FIG. 1, a language processing part 2A including a, transformation processing part 10 in place of the data flow analyzing part 5 and the optimization processing part 6 shown in FIG. 1.

The transformation processing part 10 includes a candidate intermediate code selection part 11 for selecting an intermediate code which has possibility of optimum, namely, is a candidate for optimization, an optimized pattern extracting part 12 for extracting an optimizable pattern from a syntax tree having the selected candidate intermediate code as an originating node, and an optimum intermediate code outputting part 13 for outputting an optimum intermediate code corresponding to the extracted optimizable pattern.

Figure 6A:
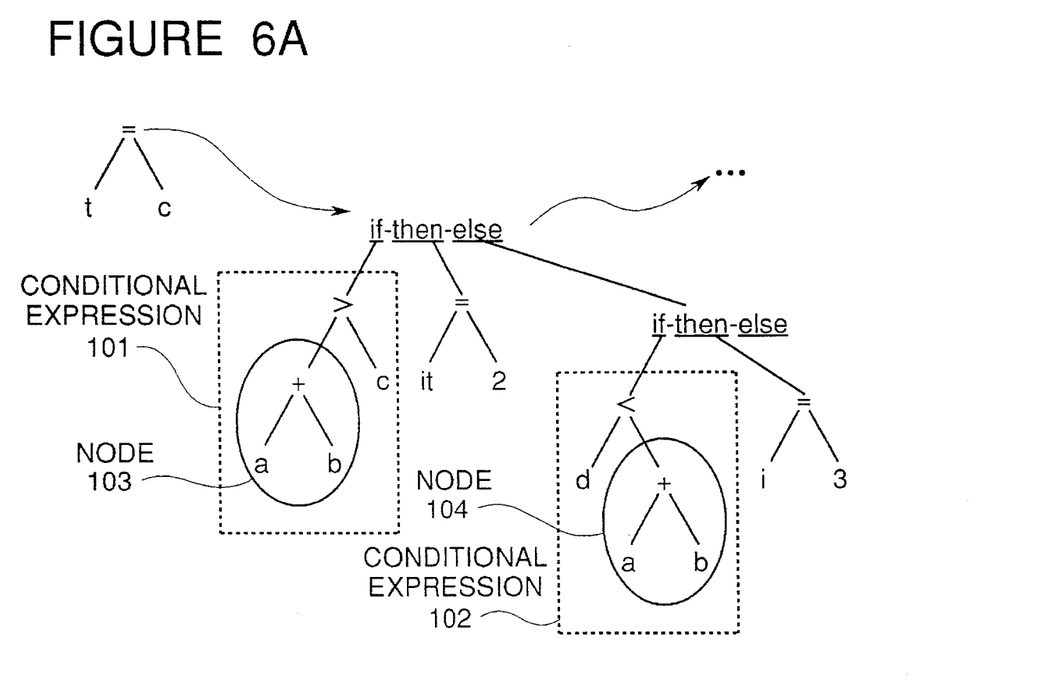
FIG. 6A and 6B respectively illustrate a syntax tree before the source program shown in FIG. 2 is transformed and a syntax tree after the source program shown in FIG. 2 is transformed.
Figure 6B:
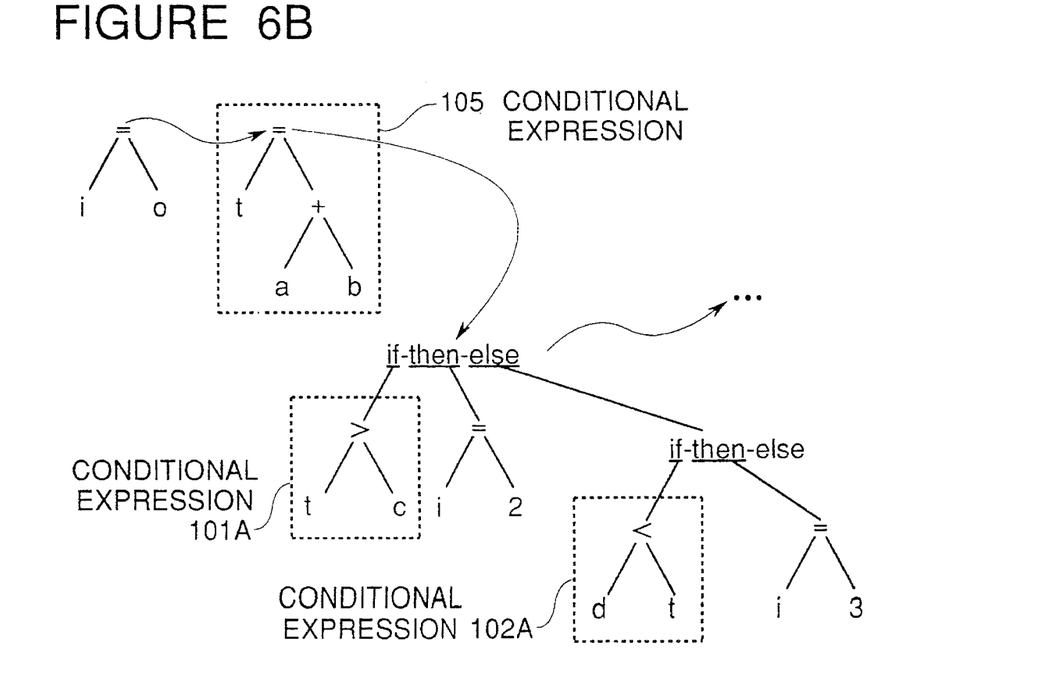
Figure 7:
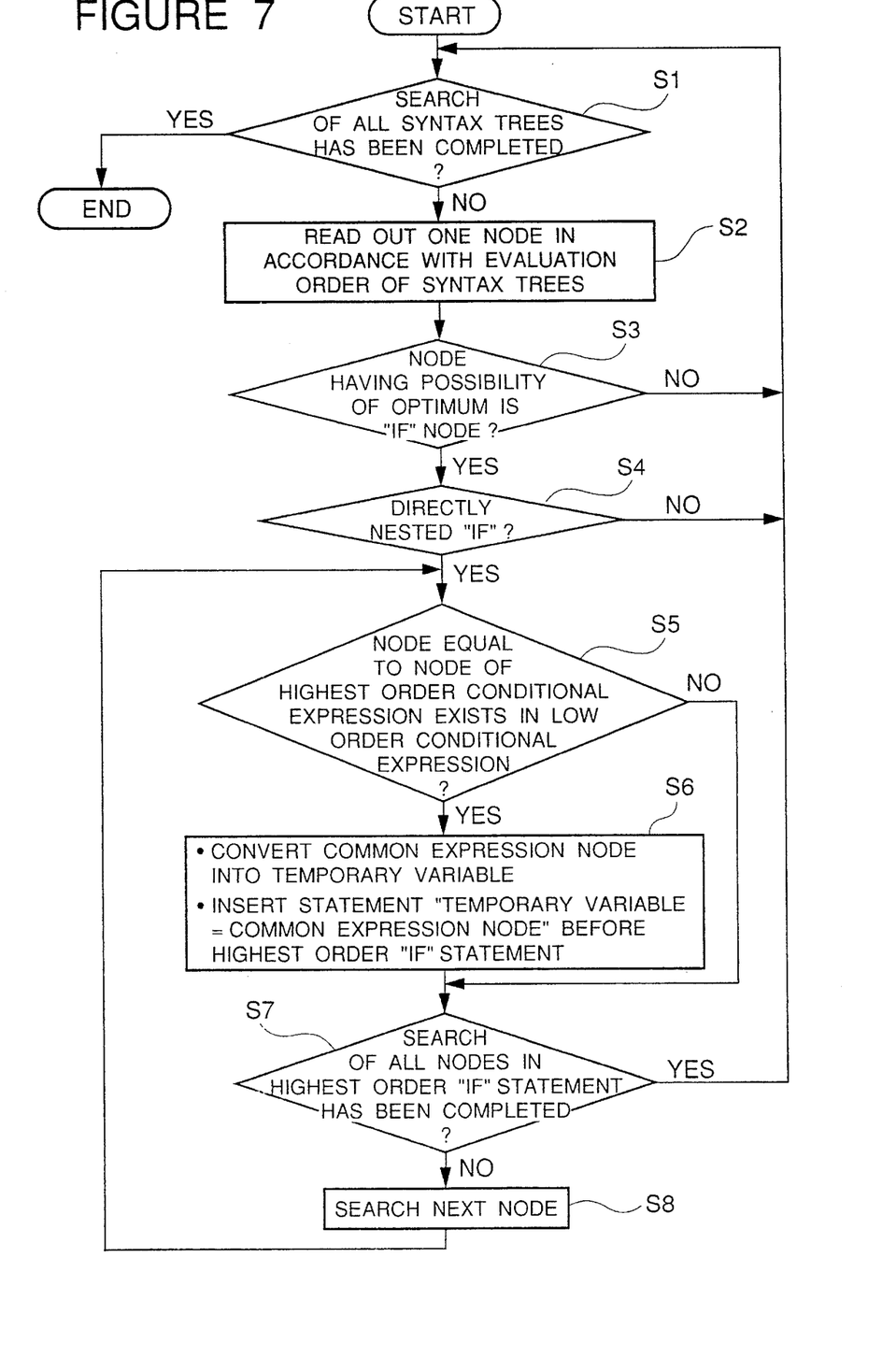
FIG. 7 is a flow chart illustrating a first embodiment of the program transformation processing method in accordance with the present invention.

Now, the program transformation processing method in accordance with the present invention will be described with FIGS. 2 and 5, FIGS. 6A and 6B respectively illustrating syntax trees obtained by transforming a portion of the source program shown in FIG. 2, and FIG. 7 showing a flow chart illustrating an optimization processing of the above mentioned syntax trees performed in the transformation processing part 10.

First, the syntax analyzing part 3 receives the source program from the source file 1, and analyzes the content of the received source program so as to generate a syntax tree which is an intermediate code, which is then stored in the intermediate file 4. The candidate intermediate code selection part 11 reads the syntax tree from the intermediate file 4 so as to search the syntax tree in accordance with an ordinary evaluation order (Step S2 in FIG. 7). If the node having possibility of optimization, namely, the optimization candidate node is selected (Step S3 in FIG. 7), the control is shifted to the optimized pattern extracting part 12. In this embodiment, attention is paid to the "if" node as the above mentioned optimization candidate node. In the optimized pattern extracting part 12, there is examined whether or not the selected "if" node is directly nested (Step S4 in FIG. 7).

Here, the "direct nesting" means that, in the above mentioned syntax tree, the "if-then-else" node is directly coupled to "then" or "else" constituting the "if-then-else" in a node corresponding to an "if" statement in the source program. Therefore, if "if-then-else" node is coupled through another statement to "then" or "else", it is not said that it is directly nested.

If the direct nesting is detected, a search is performed until an "if" conditional expression (101 in FIG. 6A), a conditional expression directly under "then" or a conditional expression directly under "else" (102 in FIG. 6A) and a conditional expression of the directly nested deepest "if" statement. These conditional expressions are sequentially evaluated until the condition becomes true. Accordingly, the value of operands such as variables constituting these conditional expressions is not fundamentally changed. Therefore, subexpressions common to those conditional expressions, namely, common subexpressions are extracted. In this embodiment, it is deemed that the common subexpression is detected, if a node equal to a node in the highest order conditional expression exists in a lower order conditional expression (Step S5 in FIG. 5).

If the common expression is detected, the syntax tree is modified into an optimum form in the optimum intermediate code output part 13. Namely, the detected common subexpression node is replaced with a temporary variable, and the common subexpression node is inserted before the highest order "if" statement as the statement "temporary variable= common subexpression node" (Step S6 in FIG. 7). If the above mentioned modification has been completed, the operation returns to the optimized pattern extracting part 12 so that the above mentioned common subexpression extraction is continued to complete the search of nodes of in all conditional expressions of the highest order "if statement (Step S7 in FIG. 7). With this, the extraction of the optimized pattern for the "if" statement is completed. Thereafter, the operation returns to the candidate intermediate code selection part 11, so that the operation is repeated until all the syntax trees from which the "if" node are to be extracted are searched (Step S1 in FIG. 7).

Next, with reference to FIGS. 6A and 6B, explanation will be made on the process of extracting the common subexpressions form the nodes corresponding to the directly nested "if" statement, and on the process of modifying the syntax tree; Here, a "if-then-else" node will be simply called a "if" node, Referring to FIG. 6A, the syntax tree before transformation includes a second "if" node directly nested to the first "if" node corresponding to the "if" statement on the second line in the source program shown in FIG. 2, conditional expressions 101 and 102 coupled to "if" of the first and second "if" nodes, and expression nodes 103 and 104 included in the conditional expressions 101 and 102.

First, a target node to be searched is determined in accordance with the execution order of the evaluation of the conditional expression 101. Here, as a first target node to be searched, the expression node 103 composed of the node [a+b] is considered, and whether or not the same expression node exists in the conditional expression 102 is searched. This conditional expression 102 is similarly searched n accordance with the execution order of the evaluation. First, the nodes at a left side of [<] is searched, but since it is not an operation node, the processing further advances. The nodes at a right side of [<] is searched. The expression node 104 [a+b] is the same node as the expression node 103 to be compared, and therefore, a pattern matching is obtained. Since the conditional expression 102 does not include a further node [a+b], the processing moves into a transformation of the syntax tree. If the "if" statement is nested deeper than the example shown in FIG. 6A, and if other conditional expressions exist, the above mentioned movement of the processing is performed after the node [a+b] has been searched in the other conditional expressions.

Referring to FIG. 6B illustrating the syntax tree after transformation, the transformation of the syntax tree is performed by substituting a temporary variable "t=(a+b)" for the extracted node [a+b]. The conditional expressions 102 and 103 shown in FIG. 6A are expressed as corresponding conditional expressions 101A and 102A after transformation. Then, the node [a+b] is moved before the highest order "if" statement, by putting the node [a+b] at the expression node 105 of the temporary variable "t=(a+b)".

With the above mentioned processing, the modification of the syntax tree has been completed, and therefore, the processing returns to the extraction of the common subexpression.

A second target node to be searched is the conditional expression 101A which is a node [t+c] including the just preceding transformed portion. However, since the conditional expression 101A includes only the node [d+t], it is different from the second target node. Therefore, the transformation is not performed.

Thus, since all of the conditional expression 101 has been searched, the extraction of the common subexpression in the "if-then-else" node and the modification of the syntax tree have been completed.

If the conditional expression includes an operator which has an action modifying the value of available, such as a substitution operator or a monadic operator increasing an operand by one, the optimization cannot be made on statements following the "if" node to be considered. Therefore, the control returns to the candidate intermediate code selecting part. The presence of these operators can be detected by the expression node search at the time of extracting the common subexpression.

Figure 8A:
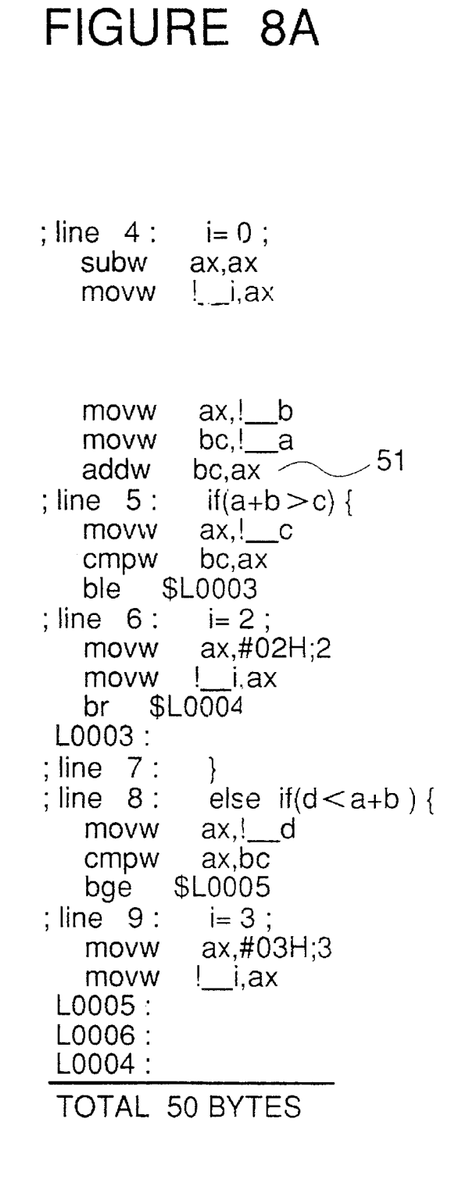
FIGS. 8A and 8B respectively illustrate one example of an object code after the optimization has been performed in accordance with the embodiment of the present invention, and one example of an object code before the optimization is performed in accordance with the embodiment of the present invention.
Figure 8B:
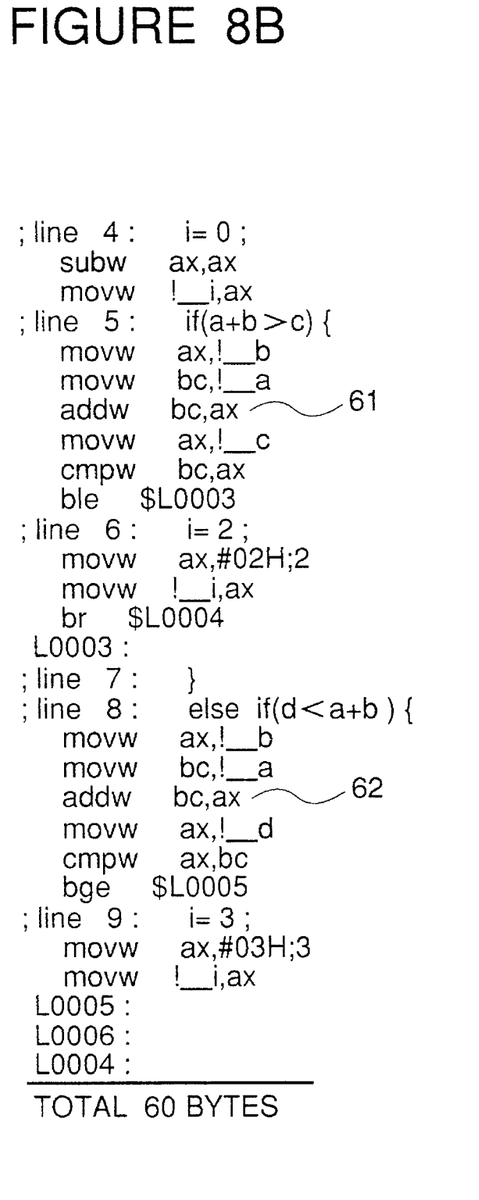

As one example, the processing is applied to an instruction set for the NEC 78K series single chip microcomputer μPD78328 described in "NEC 16/8 bit Single Chip Microcomputer μPD 78328 User's Manual IEU-693E", 1993, Pages 205–224. Referring to FIG. 8A, illustrating an object which is a code output result corresponding to the source program shown in FIG. 2, obtained by the above mentioned optimization processing, it will be noted that the calculation of [a+b] is performed only one time by an instruction statement 51, since [a+b] is moved to a forward position. On the other hand referring to FIG. 8B, there is illustrated an object which is a code output result corresponding to the source program shown in FIG. 2, in the case that the above mentioned optimization processing is not applied. In this case, the calculation of [a+b] is performed two times by instruction statements 61 and 62, as shown in the syntax tree. Comparing FIGS. 8A and 8B, the size of the object obtained by the above mentioned optimization processing is shorter than that obtained without applying the above mentioned optimization processing, by 10 bytes.

Now, a second embodiment of the program transformation processing method in accordance with the present invention will be described with reference to FIG. 9 which is a flow than illustrating the second embodiment of the program transformation processing method.

The second embodiment is different from the first embodiment in that the second embodiment includes steps S14 to S16 in place of the steps S4 to S6 in the first embodiment.

In addition, the first embodiment is so configured to pay attention to the "if" node as the optimization candidate node and to extract the common expressions form the conditional expressions so as to move the common expressions before the "if" statement for the purpose of optimizing the intermediate code. However, the second embodiment is so configured to pay attention to the "if" node as the optimization candidate node, similarly to the first embodiment, but to extract a different optimized pattern so as to generate a corresponding optimized intermediate code.

A program transformation processing system for performing the second embodiment of the program transformation processing method is the same as that shown in FIG. 5.

Now, the second embodiment of the program transformation processing method will be described with reference to FIGS. 5 and 9.

Figure 9:
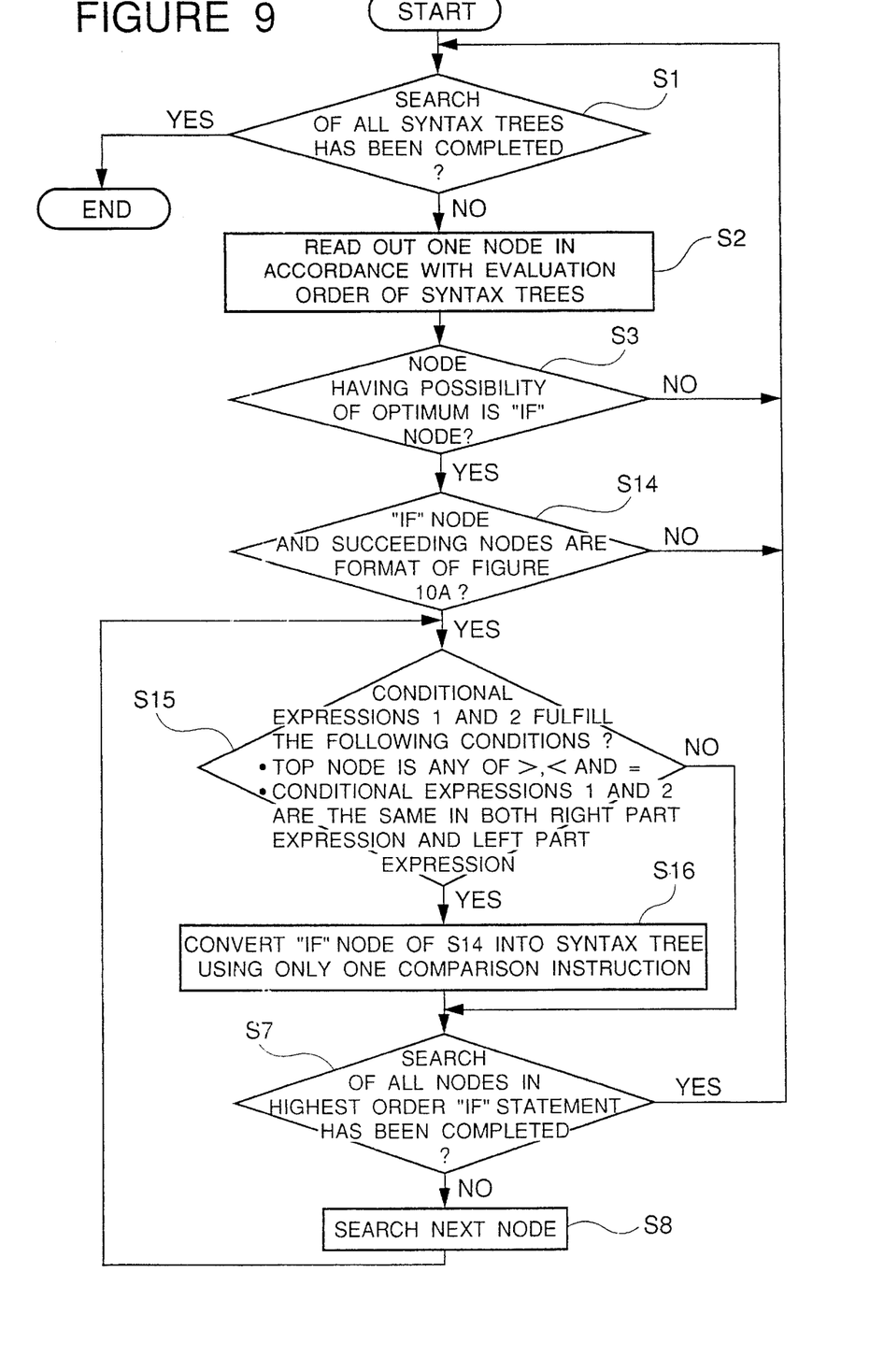
FIG. 9 is a flow chart illustrating a second embodiment of the program transformation processing method in accordance with the present invention.

Firstly, similarly to the first embodiment, the syntax analyzing part 3 generates the syntax tree, and the candidate intermediate code selection part 11 searches the generated syntax tree so as to select the "if" node which is the optimization candidate node (Steps S1 to S3 in FIG. 9).

Figure 10A:
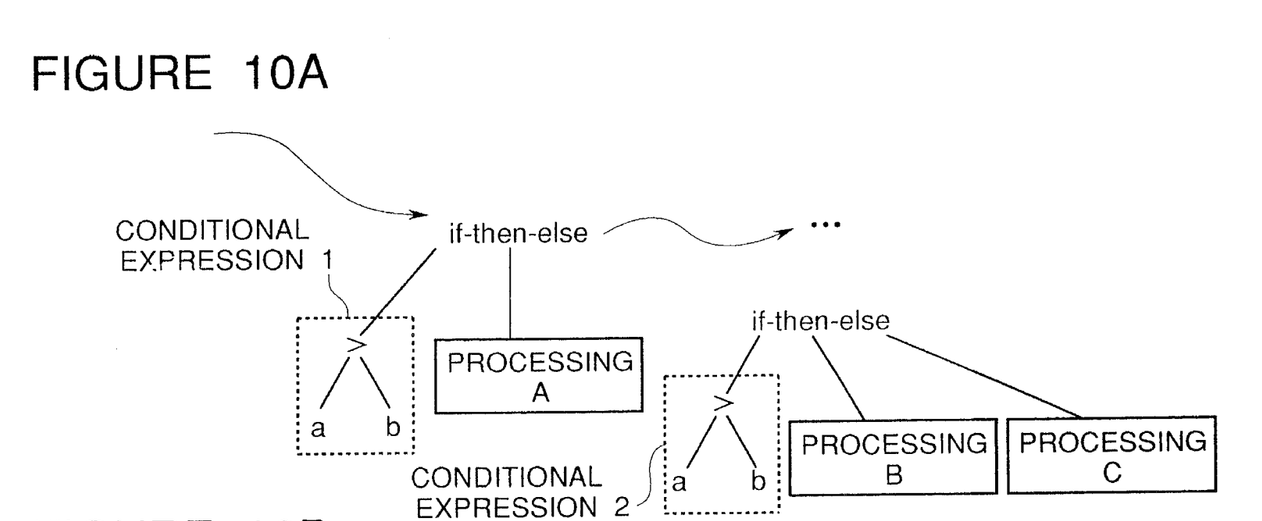
FIGS. 10A and 10B respectively illustrate one example of a syntax tree before the source program shown in FIG. 2 is transformed in accordance with the embodiment of the present invention, and one example of a syntax tree after the source program shown in FIG. 2 has been transformed in accordance with the embodiment of the present invention.

Thereafter, the optimized pattern extracting part 12 checks whether not not the extracted "if" node and succeeding statements is in a predetermined structure, for example, in a syntax tree structure as shown in FIG. 10A corresponding to the following C-language source program (Step 14 in FIG. 9).

if (conditional expression 1) {
processing A
}
else if (conditional expression 2) {
processing B
}
else {
processing C
}

Next, if it is the "if" node having the above mentioned structure, whether or not the following two conditions are fulfilled is checked in connection the conditional expressions 1 and 2. The first condition is that top nodes in the conditional expressions 1 and 2 are any one of ">", "<" and "=" but are different from each other. The second condition is that right part subexpressions of the conditional expressions 1 and 2 are the same and left part subexpressions of the conditional expressions 1 and 2 are the same. The "if" statement meeting these conditions is expressed as follows by the syntax tree shown in FIG. 10A and the C-language source program.

if (a>b) {
processing A
}
else if (a<b) {
processing
}
else {/*a=b*/
processing C
}

Figure 10B:
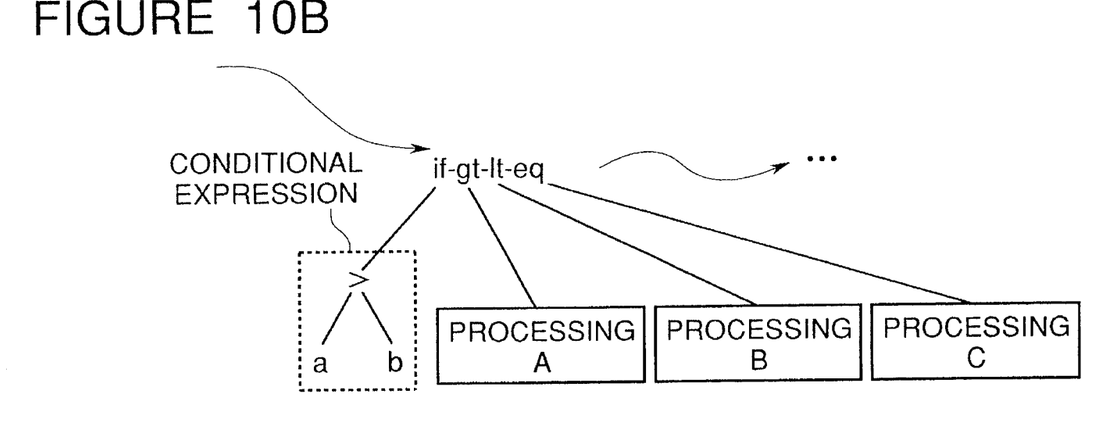

This "if" statement examines the large-and-small relation between "a" and "b", and branches to one of three processings in accordance with the result o the examination. Therefore, if the code for this processing is generated with the intermediate codes, it is disadvantageous since the large-and-small comparison between "a" and "b" is executed two times in the object before the transformation of the generated result. The examination of the large-and-small relation between "a" and "b" can be executed with only one comparison, and therefore, the optimized intermediate code output part 13 transforms the syntax tree in FIG. 10A and generates a new syntax tree as shown in FIG. 10B in which the comparison instruction is outputted only one time (Step S16). [if-gt-lt-eq] is the name of a new node. A conditional expression node for comparing the two expressions is put below "if", and if the left part is great (GreaT) in comparison with the right part as the result of the comparison, the processing A node is put under "gt". If the left part is little (LiTtle) in comparison with the right part as the result of the comparison, the processing B node is put under "lt", and if the left part is equal (EQual) to the right part, the processing C node is put under "eq".

If the transformation has been completed, the processing returns to the optimized pattern extracting part 12, and the Steps S7, S8 and S1 are performed so that the processing is repeated until the search for all the syntax trees from which the "if" node is to be extracted has been completed.

Figure 11:
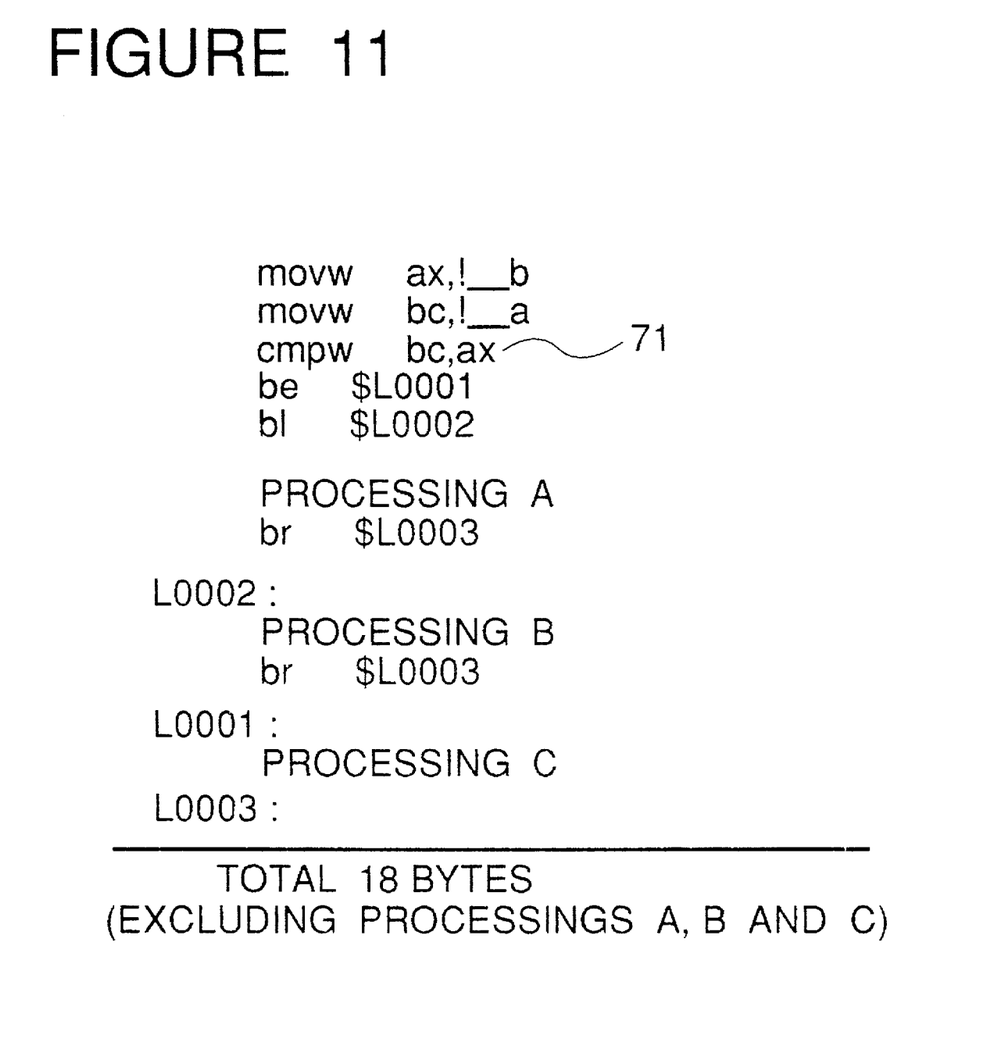
FIG. 11 illustrate an object code after the optimization has been performed in accordance with the embodiment of the present invention.

Referring to FIG. 11, there is shown an object after the transformation which is the result of generating instructions codes of the single chip microcomputer mentioned hereinbefore in connection with the transformed syntax tree. In this case, the comparison between "a" and "b" is executed only one time with an instruction statement 71 on line 3. This processing is shortened by 12 bytes in comparison with the code size of the object before transformation.

Here, consider the processing time for the optimization processing. In both of the first and second embodiments, the time for reading the intermediate code is a sum of the reading time for extracting the optimization candidate node after the syntax tree is generated, and a predetermined number of reading in connection with the conditional expressions for checking the optimum possibility of the "if" statement. In this connection, the predetermined number of reading in connection with the conditional expressions is equal to the number of the highest order nodes, and therefore is not so large since a complicated expression is not ordinarily written. In addition, the conditional expressions is only a small part of the whole of the syntax tree.

In the conventional data-flow analysis, on the other hand, the intermediate codes must be read out at least two time, in particular in a reversed direction until the common subexpression is detected. Comparing the first and second embodiments with the conventional example in this intermediate code reading time, the embodiments are extremely shorter than the conventional example.

Next, the algorithm is compared. The embodiments of the present invention do not require an operation processing of the complicated algorithm for solving the data-flow equations. The optimization processing time of the present invention mainly depends upon the searching time, and the extent of the search is limited to only the conditional expressions of the optimization candidate. Accordingly, the search time is not so long.

Totally considering the above mentioned matters, the present invention can greatly reduce the processing time for the optimization.

A required memory capacity is examined. The embodiments of the present invention search the intermediate codes themselves, and therefore, do not need an additional memory capacity for holding the information for optimization, which was required in the conventional data-flow analysis. Accordingly, the present invention can remarkably reduce the required memory capacity, and therefore, it is possible to ceaselessly perform the optimization, independently of the size of the source program, in a machine having a limited memory capacity. In other words, with a small capacity of memory and with a high speed processing, it is possible to generate the object which can be executed for a short time.

As seen from the above, the program transformation processing method in accordance with the present invention is such that, for a source program such as an "if" statement which can be divided into a plurality of basic blocks, the intermediate codes are modified and optimized in the course of the syntax analysis. With this feature, it is possible to optimize the object to be generated, without using the global data-flow analysis which is a complicated algorithm. Therefore, the number of processing steps can be reduced, and accordingly, the optimization processing time can be shortened, and an object having a short execution time can be obtained.

In addition, the memory capacity required for the compiling processing can be greatly reduced.

Furthermore, it is possible to optimize without exception, in a machine having a limited memory region, independently of the size of a source program.

The invention has thus been shown and described with reference to the specific embodiments. However, it should be noted that the present invention is in no way limited to the details of the illustrated structures but changes and modifications may be made within the scope of the appended claims.

I claim:

1. A program transformation processing system comprising:

a syntax analyzing means receiving a source program for analyzing the syntax of the received source program and generating intermediate codes in a predetermined format, and an optimization processing means receiving the intermediate codes to perform a predetermined optimization processing for generating an object code having as small program size as possible and as short execution time as possible, the optimization processing means including:

a candidate intermediate code selection means for selecting from the intermediate codes an optimization candidate intermediate code which meets with a predetermined selection condition and which has possibility of one being to be optimized, an optimized pattern extracting means for performing a searching using the candidate intermediate code as a starting point, to extract an optimized pattern which is a pattern of the intermediate codes to be optimized, and an optimized intermediate code outputting means for outputting an an optimized intermediate code corresponding to the optimized pattern.

2. A program transformation processing method configured to receive a source program for analyzing the syntax of the received source program and generating intermediate codes in a syntax tree structure composed of nodes in a predetermined format, and then to receive the intermediate codes to perform a predetermined optimization processing for generating an object code having as small program size as possible and as short execution time as possible, the program transformation processing method comprising:

a first step of receiving the intermediate codes and performing a search by reading nodes of the syntax trees in accordance with a predetermined evaluation order, for the purpose of outputting the read nodes;

a second step of selecting from the read nodes an optimization candidate intermediate node which meets with a predetermined selection condition and which has possibility of one being to be optimized;

a third step of searching and detecting a directly nested node which is a node directly coupled to a predetermined constitutive word of the candidate node;

a fourth step of discriminating whether or not a second conditional node equal to a first conditional node corresponding to a predetermined first conditional statement in a highest order directly nested node is included in a lower order second conditional statement when the directly nested node is detected, and of detecting the first and second conditional nodes as a common subexpression if the above mentioned second conditional node is included in the lower order second conditional statement; and a fifth step of responding to the detection of the common subexpression to modify the syntax tree into an optimized form meeting with the optimization processing.

3. A method claimed in claim 2 wherein the candidate intermediate node is an "if" node corresponding to an "if" statement, and the first and second conditional nodes are respectively first and second expression nodes included in first and second conditional expressions corresponding to highest order first and lower order second "if" nodes, respectively, and wherein the fifth step replaces the common subexpression by a predetermined temporary variable and inserts before the highest order "if" statement, a statement indicating that the temporary variable is equal to the common subexpression node.

4. A program transformation processing method configured to receive a source program for analyzing the syntax of the received source program and generating intermediate codes in a syntax tree structure composed of nodes in a predetermined format, and then to receive the intermediate codes to perform a predetermined optimization processing for generating an object code having as small program size as possible and as short execution time as possible, the program transformation processing method comprising:

a first step of receiving the intermediate codes and performing a search by reading nodes of the syntax trees in accordance with a predetermined evaluation order, for the purpose of outputting the read nodes;

a second step of selecting from the read nodes an optimization candidate intermediate node which meets with a predetermined selection condition and which has possibility of one being to be optimized;

a third step of discriminating that the candidate intermediate node is a first syntax tree structure including predetermined first and second conditional expressions;

a fourth step of, if the candidate intermediate node is the first syntax tree structure, discriminating if the first and second nodes of each of the first and second conditional expressions are any one of a first inequality sign indicating that a right part is larger than a left part, a second inequality sign indicating that a right part is smaller than a left part, and an equality sign indicating that a right part is equal to a left part, but are different from each other, the fourth step also discriminating that respective right parts of the first and second conditional expressions are the same and respective left parts of the first and second conditional expressions are the same; and a fifth step of generating a second syntax tree which outputs only one comparison instruction for comparing between the right part and the left part.

* * * * *